Patented Dec. 30, 1941

2,267,736

UNITED STATES PATENT OFFICE 2,267,736

TREATMENT OF CATALYSTS

Vladimir N. Ipatieff and Ben B. Corson, Chicago, Ill., assignors to Universal Oil Products Company, Chicago, Ill., a corporation of Delaware No Drawing. Application March 31, 1939,
Serial No. 265,137

3 Claims. (Cl. 252—244)

This invention relates particularly to the treatment of spent metal catalysts which have become fouled by the deposition of carbonaceous materials and the formation of sulfides during their use in hydrocarbon conversion reactions involving petroleum fractions which contain appreciable amounts of sulfur.

The invention is more particularly directed to the reactivation of these spent materials so that their original catalytic activity in promoting certain types of reactions is sufficiently restored to warrant their further utilization.

Reduced metal catalysts are effective in accelerating various types of hydrocarbon reactions such as, for example, cracking reactions employed in connection with petroleum fractions, dehydrogenation of specific hydrocarbon fractions or compounds, hydrogenation of unsaturated organic compounds either of a simple hydrocarbon or a more complicated character, and desulfurization of hydrocarbon fractions by partial hydrogenation. During the course of such reactions, heavy carbonaceous materials are formed in considerable amounts and these deposit upon the surfaces and in the pores of the active catalytic metals while sulfur present in the materials undergoing reaction combines with the metals to form sulfides which further coat and impair the activity of the catalysts. These poisoning reactions are more generally in evidence, the greater the activity of the catalyst and consequently are very noticeable in connection with reduced nickel catalysts since nickel has a very high catalytic activity in hydrocarbon conversion reactions and is used to a large extent commercially in processes involving the hydrogenation of unsaturated hydrocarbons such as, for example, the octenes produced by the polymerization of butenes in petroleum refining processes.

In one specific embodiment the present invention comprises a process for reactivation of spent metal and particularly nickel catalysts involving the following series of steps: (1) steaming at moderate temperatures to remove volatile organic matter; (2) oxidizing of the residual carbonaceous deposits to carbon oxides and water and oxidizing a portion of the nickel sulfide to nickel sulfate by the application of moist air or oxygen; (3) treating the partially oxidized catalytic material with chlorine and/or phosgene whereby nickel, nickel sulfide, nickel sulfate, and nickel oxide are converted into nickel chloride; (4) decomposing nickel chloride with ammonia producing catalytically active metallic nickel.

Step 1 of the process of the present invention is employed to remove substantially all adhering materials which can be volatilized by steam so that less load is placed on the second and third steps. Superheated steam is preferably employed and temperatures within the approximate range of 500–1,000 °F. may be used depending upon the type of material to be volatilized.

In the second step, the use of which is optional when carbon deposition on the catalyst is low, the temperature employed will be dependent upon the amount of sulfur present as sulfide and may vary from approximately 500 to 1,300° F. This treatment with moist oxygen-containing gas is continued until the carbonaceous deposits are substantially removed and a portion of the sulfide has been converted to sulfate. During this step some sulfur will be eliminated as sulfur dioxide and sulfur trioxide, depending upon the temperature employed, the rate of flow of oxidizing gas, and other factors. At the end of the second step, nickel will be present as the free metal, its sulfide, oxide, and sulfate, the latter being in preponderating amounts when the oxidation is substantially complete.

In the third step of the process the partially oxidized catalyst from step 2 or the steamed material from step 1 is maintained at a temperature in the approximate range of 550–900° F. while chlorine and/or phosgene is passed over it whereby the nickel, nickel sulfide, nickel oxide, and nickel sulfate are converted into nickel chloride. Incidentally, any residual carbon may be removed further by reaction with chlorine in this step. Some of the reactions involved may be represented by the following equations:

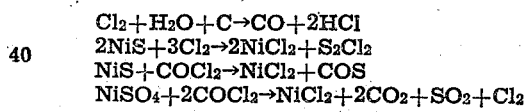

In case only slight oxidation of nickel sulfide to nickel sulfate is effected in step 2, the treating reagent subsequently used in step 3 is preferably chlorine. However, in case substantial proportions of nickel sulfate have been formed in step 2 by oxidation of nickel sulfide, the succeeding step is preferably accomplished by using a mixture of chlorine and phosgene, as indicated above, although it may also be advantageous to use phosgene alone for converting nickel sulfate into nickel chloride.

In the fourth step of the process the material produced in step 3 is treated with ammonia at a temperature in the approximate range of 550-900° F. whereby nickel chloride is converted into metallic nickel and ammonium chloride is formed as a by-product. This reaction may be represented by the following equation:

$$3NiCl_2 + 8NH_3 \rightarrow 3Ni + N_2 + 6NH_4Cl$$

The present process is principally applicable to composite catalysts comprising relatively inert materials supporting reduced metals and has been found highly advantageous in the reactivation of catalysts consisting of nickel supported on kieselguhr, these catalysts having been made by pelleting kieselguhr and hydrated nickel carbonate, using lubricants such as graphite in the pilling operation and reducing directly with hydrogen at temperatures of the order of 500–800° F. These catalysts are highly active in hydrogenating olefinic hydrocarbons to produce their saturated counterparts. The operations of the process are simple since gaseous materials only are admitted in succession to spent catalyst masses and reactivations can be employed without removing the spent catalyst from the chambers in which they are used in the hydrogenation of hydrocarbons or hydrocarbon mixtures. This method of reactivating spent hydrogenation catalysts is simple and effective and avoids the considerably more expensive method of dissolving the used catalyst and reprecipitating the nickel in a form suitable for use in the preparation of hydrogenation catalysts.

The following example is given to show the type of results normally obtainable in the operation of the process of the present invention, although not with the intention of imposing exactly corresponding limitations upon its proper scope.

A sample of used nickel catalyst supported on alumina, and containing 6% sulfur by weight of nickel present was steamed at a temperature of 750° F. for 1.5 hours and then oxidized with moist air as the temperature was increased gradually from 750 to 1,250° F. during a period of 15 hours. After this treatment the catalytic material was free from sulfide, the sulfur present being entirely in the form of sulfate. Some sulfur was eliminated as sulfur dioxide as shown by analysis of the exit gases during this period.

In the third step of this reactivation, the dry material consisting of nickel sulfate deposited upon alumina was heated in a stream of phosgene for four hours at a temperature which was increased gradually from 660 to 750° F. Sulfur dioxide was expelled as the reaction progressed and at the end of the run only traces of sulfate remained in the material being treated, the major portion of the nickel sulfate being converted into nickel chloride. This resultant mixture of nickel chloride and alumina was contacted with gaseous ammonia for six hours at 752° F. and atmospheric pressure. By this treatment 99.5% of the original chlorine content was expelled and collected quantitatively as ammonium chloride. The residual material was analyzed and found to contain 0.5% of the original chlorine content. A run showed the reactivated catalyst to have 95% of its original activity for desulfurizing gasoline by partial hydrogenation.

The character of the process of the present invention, and particularly its commercial value, are evident from the preceding specification and limited numerical data presented, although neither section is intended to limit its generally broad scope.

We claim as our invention:

1. A process for regenerating spent reduced nickel catalysts containing sulfur compounds of the metal, which comprises converting the sulfur compounds to the chloride of the metal by heating the catalyst with chlorine at about 550–900° F., and then reducing the chloride to the metal by heating with ammonia at about 550°–900° F.

2. A process for regenerating spent reduced nickel catalysts containing sulfur compounds of the metal, which comprises converting the sulfur compounds to the chloride of the metal by heating the catalyst with phosgene at about 550–900° F., and then reducing the chloride to the metal by heating with ammonia at about 550–900° F.

3. A process for regenerating spent reduced nickel catalysts containing sulfur compounds of the metal, which comprises converting the sulfur compounds to the chloride of the metal by heating the catalyst with a mixture of chlorine and phosgene at about 550–900° F., and then reducing the chloride to the metal by heating with ammonia at about 550–900° F.

VLADIMIR N. IPATIEFF.
BEN B. CORSON.